United States Patent
Chang et al.

(10) Patent No.: US 9,974,056 B2
(45) Date of Patent: May 15, 2018

(54) METHOD AND APPARATUS FOR TRANSMITTING AND RECEIVING INFORMATION IN WIRELESS DISTRIBUTED SYSTEM

(71) Applicant: ELECTRONICS AND TELECOMMUNICATIONS RESEARCH INSTITUTE, Daejeon (KR)

(72) Inventors: Kapseok Chang, Daejeon (KR); Byung-Jae Kwak, Daejeon (KR)

(73) Assignee: ELECTRONICS AND TELECOMMUNICATIONS RESEARCH INSTITUTE, Daejeon (KR)

(*) Notice: Subject to any disclaimer, the term of this patent is extended or adjusted under 35 U.S.C. 154(b) by 249 days.

(21) Appl. No.: 14/705,706

(22) Filed: May 6, 2015

(65) Prior Publication Data
US 2015/0327232 A1 Nov. 12, 2015
US 2016/0128044 A9 May 5, 2016

(30) Foreign Application Priority Data

| May 2, 2014 | (KR) | 10-2014-0053550 |
| May 9, 2014 | (KR) | 10-2014-0055857 |
| Apr. 20, 2015 | (KR) | 10-2015-0055549 |

(51) Int. Cl.
*H04L 29/08* (2006.01)
*H04W 72/04* (2009.01)
(Continued)

(52) U.S. Cl.
CPC ... *H04W 72/0406* (2013.01); *H04L 29/08306* (2013.01); *H04L 67/104* (2013.01);
(Continued)

(58) Field of Classification Search
CPC .............. H04W 56/00; H04W 56/001; H04W 72/0406; H04W 84/12; H04W 4/008;
(Continued)

(56) References Cited

U.S. PATENT DOCUMENTS

2009/0219910 A1* 9/2009 Han ..................... H04J 11/0069
370/343
2011/0058528 A1 3/2011 Chang et al.
(Continued)

FOREIGN PATENT DOCUMENTS

KR 10-2009-0004780 A 1/2009

OTHER PUBLICATIONS

Chang et al., doc. IEEE 802.15-14-250-00-0008, May 5, 2014.*
(Continued)

*Primary Examiner* — Jae Y Lee
*Assistant Examiner* — Aixa Guadalupe-Cruz

(57) ABSTRACT

When a transmitter transmits a first Timing Offset Indication iDentifier (TOID) of a plurality of TOIDs representing timing offset of a frame, the transmitter determines a first codeword corresponding to the first TOID of a plurality of codewords representing a subcarrier. The transmitter allocates a busy tone to a first subcarrier that the first codeword represents. The transmitter transmits the busy tone.

10 Claims, 5 Drawing Sheets

(51) Int. Cl.
   *H04W 56/00* (2009.01)
   *H04W 84/12* (2009.01)
   *H04W 28/02* (2009.01)

(52) U.S. Cl.
   CPC ......... *H04W 56/00* (2013.01); *H04W 56/001* (2013.01); *H04W 84/12* (2013.01); *H04W 4/70* (2018.02); *H04W 4/80* (2018.02); *H04W 28/0215* (2013.01)

(58) Field of Classification Search
   CPC .............. H04W 74/0808; H04W 4/005; H04L 67/104; H04B 7/0413
   See application file for complete search history.

(56) References Cited

U.S. PATENT DOCUMENTS

| | | |
|---|---|---|
| 2014/0341206 A1 | 11/2014 | Shin et al. |
| 2015/0057011 A1* | 2/2015 | Di Girolamo .... H04W 74/0808 455/454 |
| 2015/0085836 A1* | 3/2015 | Kang ................ H04W 74/0808 370/336 |

OTHER PUBLICATIONS

Kapseok Chang et al., "Harmonized PHY Proposal from ETRI and NICT", IEEE P802.15, Nov. 3, 2014, pp. 1-48, IEEE.
Hyoungchul Bae et al., "Draft 0.6", IEEE 802.15.8 PAC (Peer Aware Communications), Jan. 14, 2015, pp. 1-112, IEEE.
Kapseok Chang et al., "ETRI PHY Proposal for PAC", doc.: IEEE 802.15-14-0250-01-0008, May 5, 2014, pp. 1-27.

* cited by examiner

METHOD AND APPARATUS FOR TRANSMITTING AND RECEIVING INFORMATION IN WIRELESS DISTRIBUTED SYSTEM

CROSS-REFERENCE TO RELATED APPLICATION

This application claims priority to and the benefit of Korean Patent Application Nos. 10-2014-0055857 and 10-2015-0055549 filed in the Korean Intellectual Property Office on May 9, 2014 and Apr. 20, 2015, respectively, the entire contents of which are incorporated herein by reference.

BACKGROUND OF THE INVENTION (a) Field of the Invention

The present invention relates to a method and apparatus for transmitting/receiving information.

(b) Description of the Related Art

In a conventional Wireless Local Area Network (WLAN) system, an Access Point (AP) generally centrally provides a competition-based time resource domain together with beacon start timing information (synchronization method) to a terminal. Further, in the conventional WLAN system, the terminal may only know service information (i.e., discovery information) that the AP provides when the terminal associates with the AP.

In the conventional WLAN system, because the AP provides beacon start timing information for power saving, particularly, in order for a terminal in a sleep mode to detect a search for the terminal, the terminal listens (receives) only for a predetermined time duration. Thereby, it may be regarded that a power saving effect exists, but in order to known discovery information, an entire terminal should perform an association process with an AP and thus system efficiency may be deteriorated due to power waste. For example, when a system that is associated with a first terminal does not provide a service that the first terminal wants, battery waste and time waste occur in the first terminal, and when the system provides a service that a second terminal wants, the first terminal has a negative influence on an association process of the second terminal and thus system efficiency may be deteriorated.

SUMMARY OF THE INVENTION

The present invention has been made in an effort to provide a method and apparatus for transmitting/receiving information having advantages of providing a physical layer signal that loads and carries network synchronization information, contention window size information, and collision detection information. Specifically, the present invention has been made in an effort to provide a method and apparatus for transmitting/receiving information having advantages of providing a physical layer signal that loads and carries network synchronization information, contention window size information, and collision detection information in a wireless distributed system environment.

The present invention has been made in an effort to further provide a method and apparatus for transmitting/receiving information having advantages of providing a method in which a receiving node efficiently recognizes a message in view of energy using orthogonality of a physical layer signal in a distributed node system that adapts a message-based distributed synchronization method and a transmitting frame structure that applies such a method.

An exemplary embodiment of the present invention provides a transmitting method of a transmitter. The transmitting method includes: determining, when transmitting a first Timing Offset Indication iDentifier (TOID) of a plurality of TOIDs representing timing offset of a frame, a first codeword corresponding to the first TOID among a plurality of codewords representing a subcarrier; allocating a busy tone to a first subcarrier that the first codeword represents; and transmitting the busy tone.

The transmitting method may further include transmitting a preamble, which is a timing reference signal in order to provide synchronization of the frame in a network in which an infrastructure does not exist.

The transmitter may be a terminal that is different from an Access Point (AP).

The number of first subcarriers that the first codeword represents may be one.

The transmitting of the busy tone may include allocating the entire or a portion of maximum power for one time domain symbol to the busy tone.

The allocating of a busy tone may include allocating the busy tone to the N (N is the natural number of 2 or more) number of first subcarriers that the N number of elements that are included in the first codeword represent.

The M (M is a natural number of 2 or more) number of subcarriers may be formed into the N number of subcarrier groups.

The N number of first subcarriers may belong to the N number of subcarrier groups, respectively.

A Hamming distance between the first codeword and the remaining codewords of the plurality of codewords may be 2 or more.

The transmitting of the busy tone may include allocating 1/N of maximum power for one time domain symbol to each of busy tones that are allocated to the N number of first subcarriers.

At least one of the N number of subcarrier groups may correspond to a first time domain symbol, and at least one thereof may correspond to a second time domain symbol.

A synchronization slot that is included in the frame may include: a nulling segment that is located before the preamble and that reduces signal collision; the preamble; a Timing Offset Indication Field (TOIF) that is located after the preamble and that provides timing offset of the frame; and a Contention-Window Indication Field (CWIF) that is located after the preamble and that provides a size of a contention window.

Another embodiment of the present invention provides a transmitting method of a transmitter. The transmitting method includes: determining, when transmitting a first Contention Window Indication iDentifier (CWID) of a plurality of CWIDs representing a size of a contention window, a first codeword corresponding to the first CWID of a plurality of codewords representing a subcarrier; allocating a busy tone to a first subcarrier that the first codeword represents; and transmitting the busy tone.

The allocating of a busy tone may include allocating the busy tone to the N (N is the natural number) number of first subcarriers that the N number of elements that are included in the first codeword represent.

The M (M is a natural number of 2 or more) number of subcarriers may be grouped into an N number of subcarrier groups.

The N number of first subcarriers may belong to the N number of subcarrier groups, respectively.

When the N is 2 or more, a Hamming distance between the first codeword and the remaining codewords of the plurality of codewords may be 2 or more.

The transmitting of the busy tone may include allocating 1/N of maximum power for one time domain symbol to each of the busy tones that are allocated to the N number of first subcarriers, when the N is 2 or more.

Yet another embodiment of the present invention provides a transmitting method of a transmitter. The transmitting method includes: determining, when transmitting first information having a first value, a first sequence corresponding to the first value of a plurality of sequences representing a value of the first information; allocating the first sequence to a plurality of feasible subcarriers; and allocating power to the plurality of subcarriers.

The first information may be one of timing offset information of the frame, contention window size information of the transmitter, and collision detection information.

The allocating of power to the plurality of subcarriers may include: dividing maximum power for one time domain symbol into the number of the plurality of subcarriers; and allocating the divided power to each of the plurality of subcarriers.

The allocating of the first sequence to a plurality of feasible subcarriers may include allocating, when the first sequence is one, each element of the first sequence having a length corresponding to the number of the plurality of subcarriers to each of the plurality of subcarriers.

The determining of a first sequence may include: determining a first codeword corresponding to the first value among a plurality of codewords; and determining the N (N is a natural number of 2 or more) number of first sequences corresponding to the first codeword among the plurality of sequences.

The allocating of the first sequence to a plurality of feasible subcarriers may include allocating, when the plurality of feasible subcarriers are the M number (M is a natural number of 2 or more), each element belonging to each of the first sequences having a length of M/N to each of the M number of subcarriers.

The allocating of each element may include allocating, when the N is 2, one of the two first sequences to odd-numbered subcarriers of the M number of subcarriers and allocating the remaining one of the two first sequences to even-numbered subcarriers of the M number of subcarriers.

The allocating of each element may include allocating, when the N is 4, a second sequence of the four first sequences to a first subcarrier group among the M number of subcarriers, allocating a third sequence of the four first sequences to a second subcarrier group of the M number of subcarriers, allocating a fourth sequence of the four first sequences to a third subcarrier group of the M number of subcarriers, and allocating a fifth sequence of the four first sequences to a fourth subcarrier group of the M number of subcarriers.

The third sequence may be adjusted based on the second sequence.

The fifth sequence may be adjusted based on the fourth sequence.

DETAILED DESCRIPTION OF THE EMBODIMENTS

Figure 1:
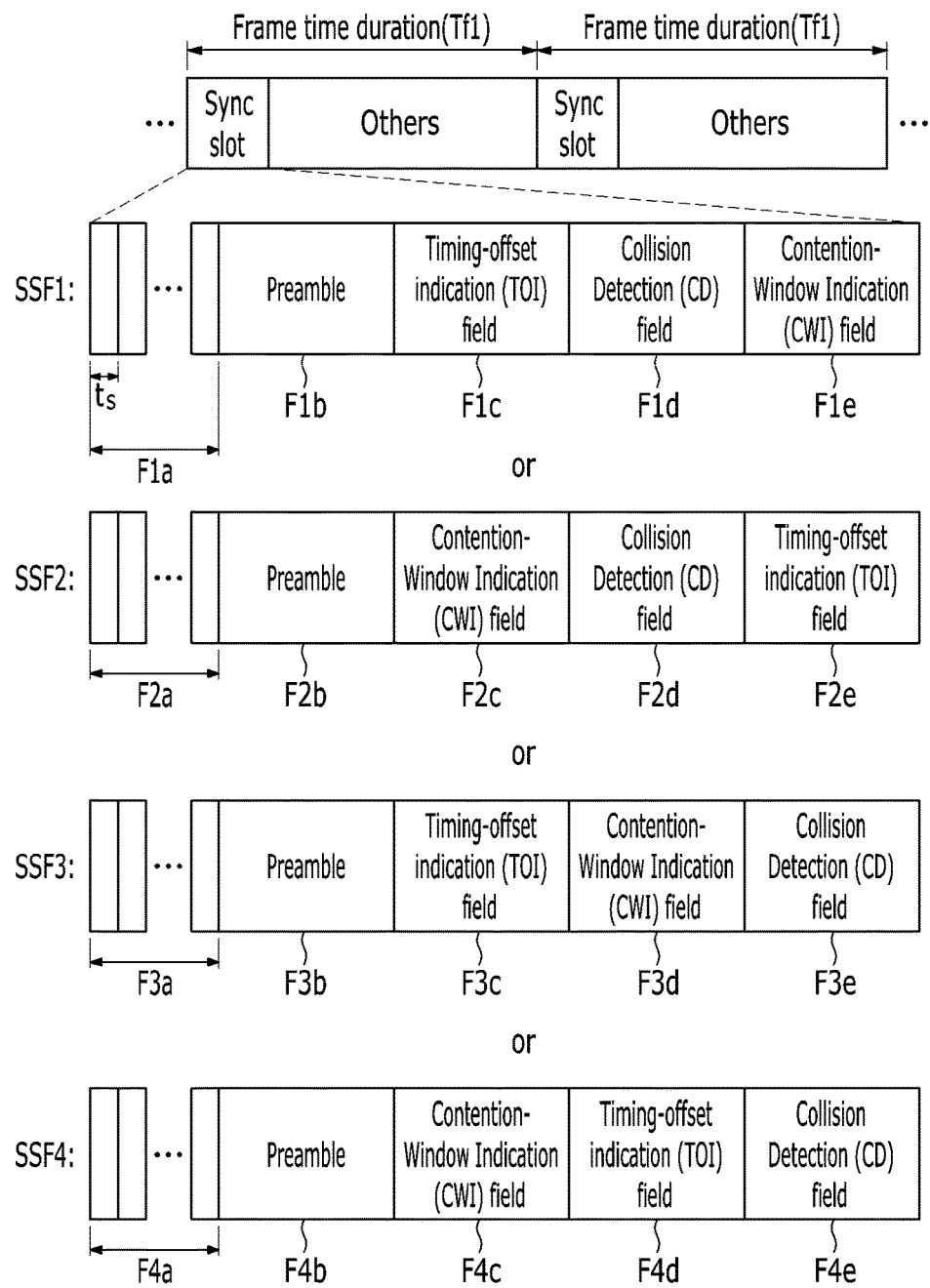
FIG. 1 is a diagram illustrating a frame structure for a distributed node system according to an exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

In the entire specification, a terminal may indicate a mobile terminal (MT), a mobile station (MS), an advanced mobile station (AMS), a high reliability mobile station (HR-MS), a subscriber station (SS), a portable subscriber station (PSS), an access terminal (AT), and user equipment (UE), and may include an entire function or a partial function of the MT, the MS, the AMS, the HR-MS, the SS, the PSS, the AT, and the UE.

Further, an access point (AP) may indicate a base station (BS), an advanced base station (ABS), a high reliability base station (HR-BS), a node B (NodeB), an evolved node B (eNodeB), a radio access station (RAS), a base transceiver station (BTS), a mobile multihop relay (MMR)-BS, a relay station (RS) that performs a BS function, a high reliability relay station (HR-RS) that performs a BS function, a macro BS, and a small BS, and may include an entire function or a partial function of the BS, the ABS, the HR-BS, the nodeB, the eNodeB, the RAS, the BTS, the MMR-BS, the RS, the HR-RS, the macro BS, and the small BS.

Unlike a WLAN system, in a distributed node system, in order to enhance system efficiency, a terminal acquires discovery information before association, and in order to reduce power consumption, a discovery time slot separately exists, and a terminal in a slip mode determines only a discovery time slot. When such a distributed node system adapts a synchronization method, the terminal in a slip mode can reduce power consumption. That is, when all terminals within a network know a boundary of a frame (e.g., a beacon) that is repeated in a time domain and know an internal slot structure (e.g., a synchronization slot, a discovery slot, and a data slot) that is included in a frame, the terminal may operate in a transmitting mode, a receiving mode, or a transmitting/receiving mode only at a specific slot (e.g., a discovery slot when the terminal is in a sleep mode) within a segment based on the boundary of the frame, and maintain an inactive state at the remaining slots. Thereby, the terminal can reduce power consumption.

However, in a distributed node system, unlike a WLAN system, because an AP that provides synchronization of a frame does not exist, a distributed synchronization method in which terminals within a network form frame synchronization within the network by participating in transmitting of a synchronization signal is used. That is, in an environment in which an infrastructure does not exist, in order for terminals themselves to form synchronization of a frame, the terminals may transmit a preamble which is a timing reference signal.

The distributed synchronization method includes a physical layer distributed synchronization method and a Medium Access Control (MAC)-based distributed synchronization method.

A physical layer distributed synchronization method is a method of corresponding synchronization between terminals using a time at which a synchronization signal is received, when terminals within a network transmit/receive a synchronization signal that is located at a first portion of a frame and that is specially designed. A synchronization signal that is used in a physical layer distributed synchronization method includes a pulse signal, a chirp signal, and a modulated Zadoff-Chu (ZC) signal, and all terminals generally use the same synchronization signal. A terminal in a receiving mode estimates timing of synchronization signals at which a plurality of terminals send, and performs a process of taking an average value between timing that is received from the plurality of transmitting terminals at constant frame segments. Thereby, frame boundary synchronization within the network may occur.

However, in a physical layer distributed synchronization method, because a receiving terminal does not know the number of terminals that transmit a simultaneously received synchronization signal, the received signal may deviate from an automatic gain control range of the receiving terminal and thus there is a problem that operation of the terminal may not be performed. Even if a received signal does not deviate from an automatic gain control range, a plurality of synchronization signals having different receiving power are mixed and thus when a received signal level is not very minutely expressed with a digital signal, a correlation estimation performance may be deteriorated. Thereby, operation of the terminal may not be performed. In order to prevent the problem, an Analog-to-Digital Converter (ADC) having a very high bit resolution may be used.

A MAC-based distributed synchronization method is a method of together transmitting additional information that is related to synchronization when a terminal transmits a synchronization signal. For example, the terminal transmits timing offset information together with a synchronization signal in a message form, and the terminal having received the synchronization signal corresponds frame synchronization using a receiving time of the synchronization signal and a timing offset value that is received in a message form. In the MAC-based distributed synchronization method, as in a physical layer distributed synchronization method, most terminals do not transmit a synchronization signal by participating in distributed synchronization setting and only one terminal or some terminals transmit a synchronization signal. The MAC-based distributed synchronization method may determine a terminal to transmit a synchronization signal using a backoff algorithm of a WLAN. That is, each terminal determines a backoff counter value with a randomly selected value within a contention window (CW) thereof, and when the backoff counter becomes zero, each terminal transmits a synchronization signal. Thereby, a probability of synchronization signal collision occurring when synchronization signals are simultaneously transmitted can be reduced. In a MAC-based distributed synchronization method, a receiving terminal takes timing by performing correlation using a sequence correlation characteristic of a synchronization signal, and in order to know timing offset information, the receiving terminal should perform channel decoding. However, in a distributed node system, because terminals should uniformly divide a synchronization signal transmitting function, it may be inappropriate for the terminal to perform channel decoding causing much power consumption, compared with correlation performance. Further, at a time duration containing timing offset information, when different timing offset information collides and is received, the terminal cannot demodulate two offset information pieces. As described above, when offset information collides, if the receiving terminal acquires two offset information pieces, collision between terminals having different distributed network synchronization may be detected in a physical layer level, and such detection information may help interlocking between two networks.

In a distributed node system that adapts a message-based distributed synchronization method (i.e., a MAC-based distributed synchronization method), a method of loading and carrying timing offset information includes a method based on a tone (hereinafter, a 'tone-based method') and a method based on a sequence (hereinafter, a 'sequence-based method'). A tone-based method and a sequence-based method will be described in detail with reference to FIGS. 1 to 4.

FIG. 1 is a diagram illustrating a frame structure for a distributed node system according to an exemplary embodiment of the present invention.

A frame having a frame time duration Tf1 includes a synchronization slot and other slots necessary for communication and that are located after the synchronization slot. For example, at the frame time duration Tf1, a synchronization slot, a discovery slot, and a data slot may exist.

A random terminal transmits a synchronization signal for providing frame start timing at the synchronization slot. Here, a synchronization signal may be a signal having terminal community (i.e., perfect correlation between synchronization signals of terminals) or may be a signal having terminal independence (i.e., non-correlation between synchronization signals of terminals). As illustrated in FIG. 1, in addition to a preamble for transmitting a synchronization signal, other fields may exist within the synchronization slot. A detailed time domain structure/format SSF1-SSF4 of the synchronization slot of FIG. 1 will be described in detail. A first time domain structure SSF1 to a fourth time domain structure SSF4 of the synchronization slot have a difference in a location of a field.

The first time domain structure SSF1 of the synchronization slot includes a nulling segment F1$a$, a preamble F1$b$ that is located after the nulling segment F1$a$, a Timing Offset Indication Field (TOIF) F1$c$ that is located after the preamble F1$b$, a Collision Detection Field (CDF) F1$d$ that is located after the TOIF F1$c$, and a Contention-Window Indication Field (CWIF) F1$e$ that is located after the CDF F1$d$. The nulling segment F1$a$ is a segment for reducing a collision probability between signals of terminals to provide timing reference, and includes slots (e.g., backoff slots) that are located in front of a synchronization signal (i.e., the preamble F1$b$) and that have a predetermined gap like $t_S$. A synchronization signal for providing timing is provided through the preamble F1$b$. The TOIF F1$c$ loads and carries timing offset information of a frame. Although not shown in FIG. 1, after the CWIF F1$e$, a single guard interval or a plurality of guard intervals having a predetermined gap may exist. Further, although not shown in FIG. 1, after the CWIF F1$e$, backoff slots may exist. Further, a time length from the preamble F1$b$ to the CWIF F1$e$ cannot exceed a time length of one backoff slot.

The second time domain structure SSF2 of the synchronization slot includes a nulling segment F2$a$, a preamble F2$b$ that is located after the nulling segment F2a, a CWIF F2c that is located after the preamble F2b, a CDF F2d that is located after the CWIF F2c, and a TOIF F2e that is located after the CDF F2d. Although not shown in FIG. 1, after the TOIF F2e, a single guard interval or a plurality of guard intervals having a predetermined gap may exist. Further, although not shown in FIG. 1, after the TOIF F2e, backoff slots may exist. In addition, a time length from the preamble F2b to the TOIF F2e cannot exceed a time length of one backoff slot.

The third time domain structure SSF3 of the synchronization slot includes a nulling segment F3a, a preamble F3b that is located after the nulling segment F3a, a TOIF F3c that is located after the preamble F3b, a CWIF F3d that is located after the TOIF F3c, and a CDF F3e that is located after the CWIF F3d. Although not shown in FIG. 1, after the CDF F3e, a single guard interval or a plurality of guard intervals having a predetermined gap may exist. Further, although not shown in FIG. 1, after the CDF F3e, backoff slots may exist. In addition, a time length from the preamble F3b to the CDF F3e cannot exceed a time length of one backoff slot.

The fourth time domain structure SSF4 of the synchronization slot includes a nulling segment F4a, a preamble F4b that is located after the nulling segment F4a, a CWIF F4c that is located after the preamble F4b, a TOIF F4d that is located after the CWIF F4c, and a CDF F4e that is located after the TOIF F4d. Although not shown in FIG. 1, after the CDF F4e, a single guard interval or a plurality of guard intervals having a predetermined gap may exist. Further, although not shown in FIG. 1, after the CDF F4e, backoff slots may exist. In addition, a time length from the preamble F4b to the CDF F4e cannot exceed a time length of one backoff slot.

An object of CWIFs F1e, F2c, F3d, and F4c is to enable a specific terminal to broadcast contention window size information thereof to peripheral terminals.

An object of CDFs F1d, F2d, F3e, and F4e is to enable a physical layer to detect collision that has occurred by a plurality of terminals.

An object of TOIFs F1c, F2e, F3c, and F4d is to enable a specific terminal to provide timing offset information of a frame to which TOIF fields F1c, F2e, F3c, and F4d belong to peripheral terminals. As a specific example, timing offset of TOIF fields F1c, F2e, F3c, and F4d existing within the frame time duration Tf1 of FIG. 1 is a time difference between a start point of the frame time duration Tf1 and a start point of preambles F1b, F2b, F3b, and F4b. A method of representing a time difference may include a method of representing an actual physical time difference and a method of representing with the integer number of a backoff slot number. That is, in order to synchronize a final time (boundary of a frame) of every frame, a timing offset concept may be introduced.

Timing offset information may be transmitted using orthogonality of a physical layer sequence (sequence-based method), may be transmitted using an orthogonal tone (e.g., subcarrier of a frequency domain) of a physical layer (a tone-based method), or may be transmitted in a message form. Specifically, the sequence-based method maps specific timing offset information to a specific sequence having orthogonality. The tone-based method maps timing offset information to a combination of a single tone (e.g., subcarrier) or multiple tones of a frequency domain. In a method of transmitting timing offset information in a message form, a terminal loads and transmits timing offset information in a message, and a terminal having received the message restores the message through channel decoding. Because the terminal may consume much power by performing channel decoding, an exemplary embodiment of the present invention will be described based on a tone-based method and a sequence-based method.

Hereinafter, for better comprehension and ease of description, as an example, the first time domain structure SSF1 of the synchronization slot will be described based on a tone-based method and a sequence-based method. However, this is only an illustration, and a tone-based method and a sequence-based method may be applied to other time domain structures SSF2-SSF4 of the synchronization slot.

Figure 2:
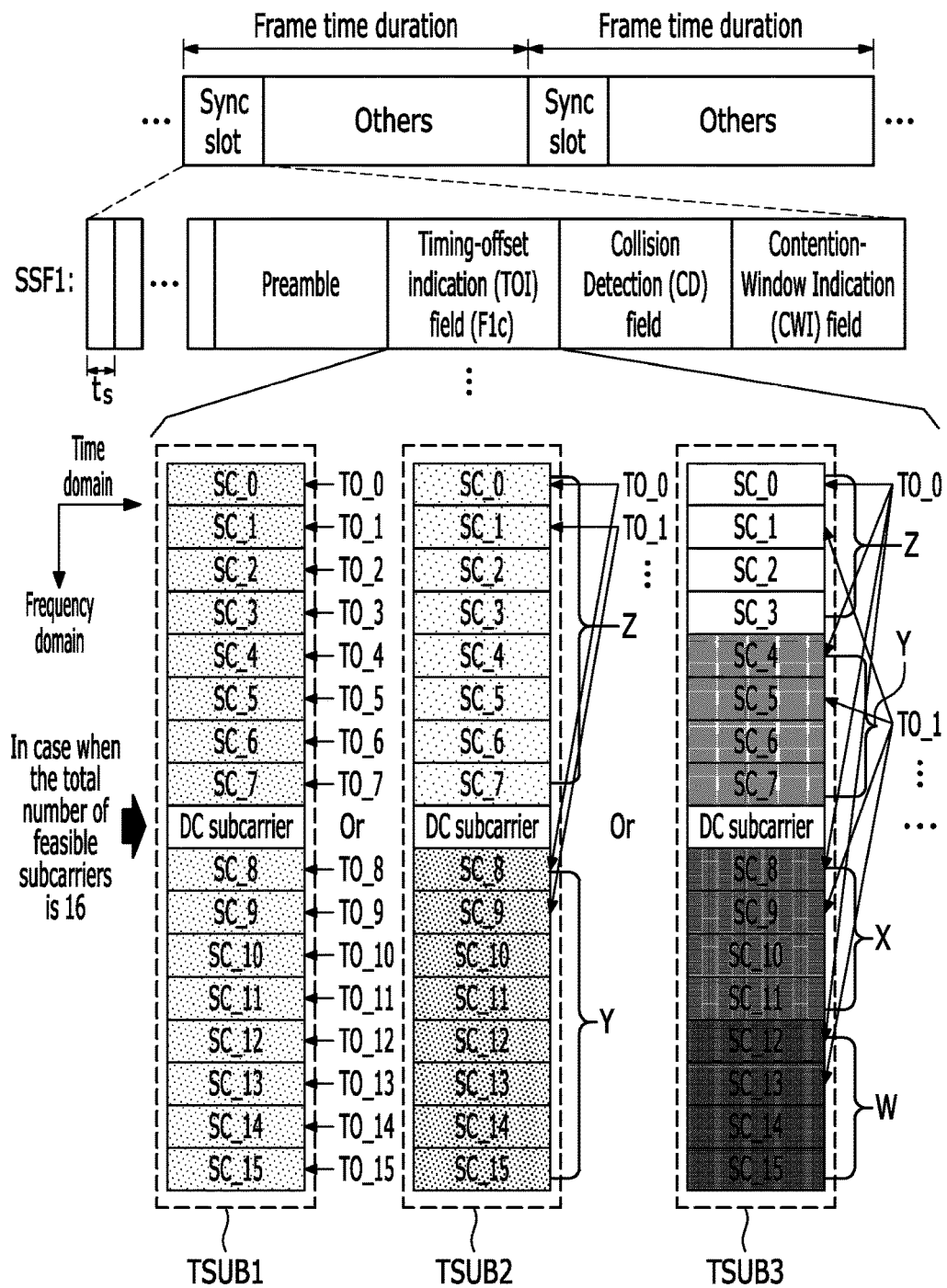
FIG. 2 is a diagram illustrating a method of loading and carrying timing offset information based on a tone.

FIG. 2 is a diagram illustrating a method of loading and carrying timing offset information based on a tone (i.e., a tone-based method). Specifically, FIG. 2 illustrates three methods (a first tone-based method, a second tone-based method, and a third tone-based method) of loading and carrying timing offset information through a TOIF F1c based on a tone (e.g., subcarrier) in a distributed node system that adapts a collision avoidance-based distributed synchronization method, as shown in FIG. 1.

The first tone-based method is illustrated in a frequency domain TSUB1 of a TOIF F1c of FIG. 2. In the first tone-based method, a location of an available tone, i.e., a feasible subcarrier, is mapped one-to-one to a Timing Offset Indication iDentifier (TOID). According to the first tone-based method, the number of distinguishable entire TOIDs becomes the entire number N of feasible subcarriers. For convenience of description, FIG. 2 illustrates a case in which the entire number N of feasible subcarriers SC_0-SC_15 is 16. Respective locations of 16 subcarriers SC_0-SC_15 are mapped to 16 TOIDs TO_0-TO_15, respectively. For example, a location of the subcarrier SC_0 may be mapped to the TOID TO_0, and a location of the subcarrier SC_1 may be mapped to the TOID TO_1. Respective TOIDs TO_0-TO_15 represent timing offset values. For example, the TOID TO_0 may represent timing offset 0 $t_S$, and the TOID TO_1 may represent timing offset 1 $t_S$. Specifically, the terminal determines a location of a subcarrier corresponding to timing offset to transmit, allocates (loads, carries) a busy tone to (at) the determined subcarrier location, and loads power in the busy tone and transmits the busy tone. For example, when timing offset that the terminal is to transmit is 8 $t_S$, the terminal allocates a busy tone to a location of the subcarrier SC_8 corresponding to the TOID TO_8 representing 8 $t_S$. The terminal loads (allocates) the entire or a portion of maximum power (hereinafter, maximum 'symbol power') that it can send per time domain symbol in a busy tone that is allocated to a location of the subcarrier SC_8 and transmits the busy tone.

The second tone-based method is illustrated in a frequency domain TSUB2 of a TOIF F1c of FIG. 2. In the second tone-based method, one TOID is mapped to a location of two subcarriers. Specifically, one TOID is mapped to one codeword (Z, Y). Here, the one codeword (Z, Y) represents two subcarriers. According to a second tone-based method, the entire number of codewords becomes the square of half of the entire number N of feasible subcarriers. For example, when N is 16, the entire number of codewords is 64. Here, Z, which is an element of the codeword (Z, Y), has a positive integer value (0-7) from 0 to (N/2)−1 and represents a subcarrier group. Specifically, Z represents a location index of feasible superordinate (or subordinate) subcarriers SC_0-SC_7. Y, which is an element of a codeword (Z, Y), has a positive integer value (e.g., 0-7) from 0 to (N/2)−1 and represents a subcarrier group. Specifically, Y represents a location index of feasible subordinate (or superordinate) subcarriers SC_8-SC_15. For example, a codeword (0, 0) may be mapped to a TOID (TO_0), and a codeword (1, 1) may be mapped to a TOID (TO_1). Respective TOIDs represent a timing offset value. When the entire number of TOIDs is smaller than that of entire codewords, a codeword to be mapped to the TOID among the entire codeword is selected. Specifically, codewords in which a Hamming distance between codewords becomes a maximum of 1 may be selected. That is, an element having the same value (e.g., 0-7) does not exist between codewords or only one element having the same value should exist between codewords. For example, an element having the same value does not exist between a codeword (0, 1) and a codeword (1, 0). That is, a Hamming distance between the codewords is 0. For another example, one element having the same value exists between a codeword (2, 5) and a codeword (2, 3). That is, a Hamming distance between the codewords is 1.

Specifically, the terminal determines a location of two subcarriers corresponding to timing offset to transmit. For example, when timing offset that the terminal is to transmit is 8 $t_S$, the terminal determines a codeword (Z, Y) (e.g., a codeword (0, 1)) corresponding to a TOID (e.g., TO_8) representing 8 $t_S$ and determines a location of two subcarriers (e.g., SC_0, SC_9) corresponding to a codeword (Z, Y) (e.g., codeword (0, 1)). The terminal allocates (loads, carries) a busy tone to (at) the determined location of two subcarriers (e.g., SC_0, SC_9), loads power in the busy tone, and transmits the busy tone. Specifically, the terminal may load half or less of maximum symbol power in each of busy tones that are allocated to a location of two subcarriers (e.g., SC_0, SC_9).

An element Z of the codeword (Z, Y) may represent a location index of feasible subordinate subcarriers SC_8-SC_15, and an element Y of the codeword (Z, Y) may represent a location index of feasible superordinate subcarriers SC_0-SC_7.

The third tone-based method is illustrated in a frequency domain TSUB3 of a TOIF F1c of FIG. 2. In the third tone-based method, one TOID is mapped to a location of four subcarriers. Specifically, one TOID is mapped to one codeword (Z, Y, X, W). Here, one codeword (Z, Y, X, W) represents four subcarriers, and each TOID represents a timing offset value. According to a third tone-based method, the entire number of codewords becomes four squares of a fourth of the entire number of feasible subcarriers N. For example, when N is 16, the entire number of codewords is 256. Here, Z, which is an element of the codeword (Z, Y, X, W), has a positive integer value (e.g., 0-3) from 0 to (N/4)−1 and represents a subcarrier group. Specifically, Z represents a location index of some superordinate (or subordinate) subcarriers SC_0-SC_3 of feasible superordinate (or subordinate) subcarriers SC_0-SC_7. Y, which is an element of the codeword (Z, Y, X, W), has a positive integer value (e.g., 0-3) from 0 to (N/4)−1 and represents a subcarrier group. Specifically, Y represents a location index of some subordinate (or superordinate) subcarriers SC_4-SC_7 of feasible superordinate (or subordinate) subcarriers SC_0-SC_7. X, which is an element of the codeword (Z, Y, X, W), has a positive integer value (e.g., 0-3) from 0 to (N/4)−1 and represents a subcarrier group. Specifically, X represents a location index of some superordinate (or subordinate) subcarriers SC_8-SC_11 of feasible subordinate (or superordinate) subcarriers SC_8-SC_15. W, which is an element of the codeword (Z, Y, X, W), has a positive integer value (e.g., 0-3) from 0 to (N/4)−1 and represents a subcarrier group. Specifically, W represents a location index of some subordinate (or superordinate) subcarriers SC_12-SC_15 of feasible subordinate (or superordinate) subcarriers SC_8-SC_15. For example, a codeword (0, 0, 0, 0) may be mapped to a TOID (e.g., TO_0) representing timing offset 0 $t_S$, and a codeword (1, 1, 1, 1) may be mapped to a TOID (e.g., TO_1) representing timing offset 1 $t_S$. When the entire number of TOIDs is smaller than an entire number of codewords, a codeword to be mapped to the TOID among the entire number of codewords is selected. Specifically, codewords in which a Hamming distance between codewords becomes a minimum of 2 may be selected. That is, an element having the same value (e.g., 0-3) does not exist between codewords, only an element having the same value (e.g., 0-3) should exist between codewords, or only two elements having the same value should exist between codewords. For example, an element having the same value does not exist between a codeword (1, 0, 0, 0) and a codeword (0, 1, 1, 2). For another example, two elements having the same value exist between a codeword (0, 1, 1, 3) and a codeword (2, 1, 0, 3).

Specifically, the terminal determines a location of four subcarriers corresponding to timing offset to transmit. For example, when timing offset that the terminal is to transmit is 6 $t_S$, the terminal determines a codeword (Z, Y, X, W) corresponding to the TOID (e.g., TO_6) representing 6 $t_S$ and determines a location of four subcarriers corresponding to the determined codeword (Z, Y, X, W). The terminal allocates (loads, carries) a busy tone to (at) the determined location of four subcarriers, and loads power in each busy tone and transmits the busy tone. Specifically, the terminal may load a fourth or less of maximum symbol power in each of busy tones that are allocated to a location of four subcarriers.

A subcarrier group that each element of the codeword (Z, Y, X, W) represents may be designed unlike the foregoing description. For example, Z may represent a location index of some subcarriers SC_8-SC_11 of feasible subordinate subcarriers SC_8-SC_15, Y may represent a location index of the remaining subcarrier SC_12-SC_15, X may represent a location index of some subcarriers SC_4-SC_7 of feasible superordinate subcarriers SC_0-SC_7, and W may represent a location index of the remaining subcarriers SC_0-SC_3.

Figure 3:
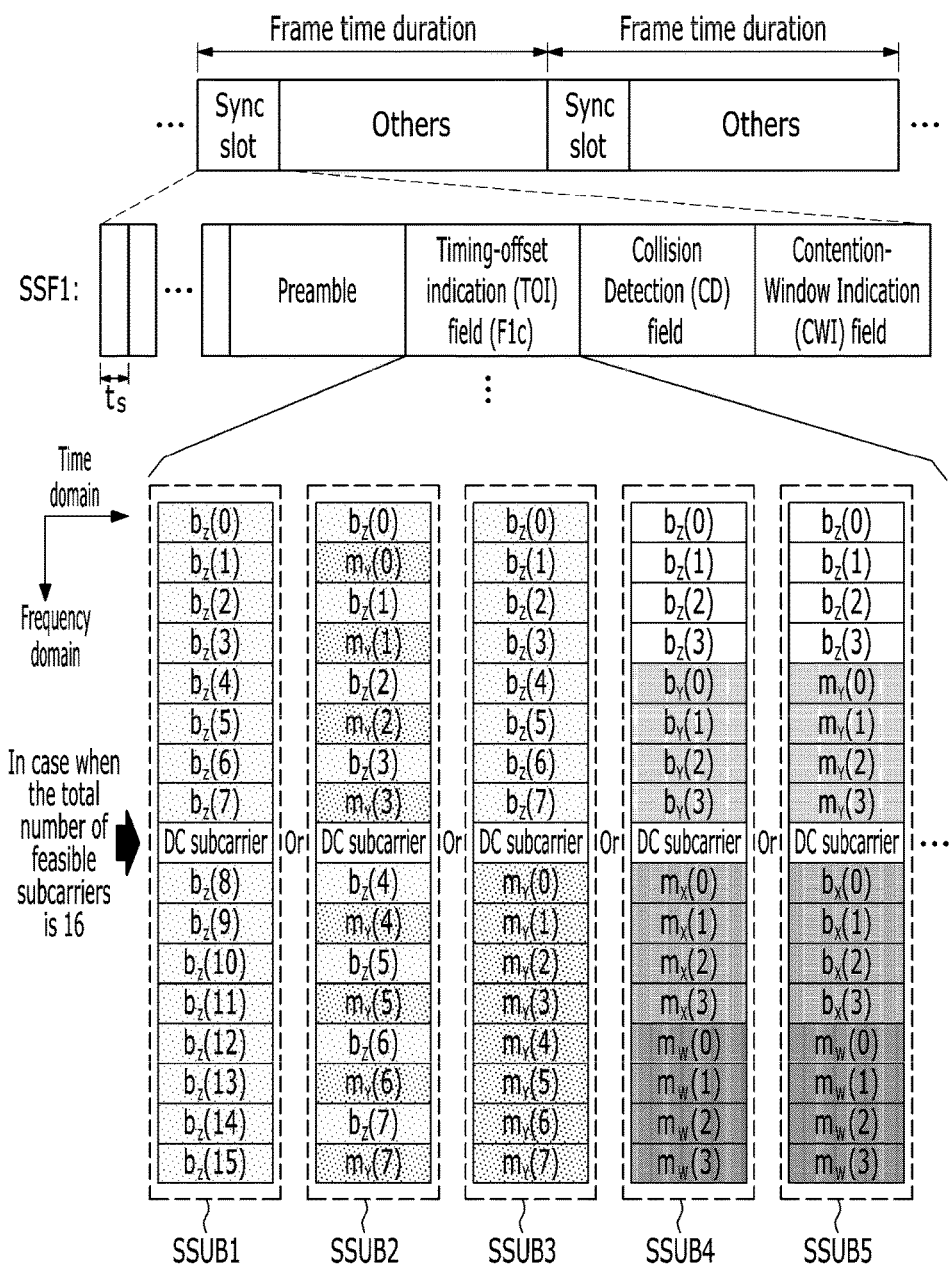
FIG. 3 is a diagram illustrating a method of loading and carrying timing offset information based on a sequence.

FIG. 3 is a diagram illustrating a method of loading and carrying timing offset information based on a sequence (i.e., a sequence-based method). Specifically, FIG. 3 illustrates five methods (first sequence-based method, second sequence-based method, third sequence-based method, fourth sequence-based method, and fifth sequence-based method) of loading and carrying timing offset information through a TOIF F1c based on a sequence in a distributed node system that adapts a collision avoidance-based distributed synchronization method of FIG. 1. For convenience of description, FIG. 3 illustrates a case in which the entire number of feasible subcarriers is 16.

The first sequence-based method is illustrated in a frequency domain SSUB1 of a TOIF F1c of FIG. 3. In the first sequence-based method, an index of a sequence is mapped to the TOID. That is, the sequence and the TOID are mapped with one-to-one. Each TOID represents a timing offset value. For example, a TOID TO_8 may represent timing offset 8 $t_S$. According to the first sequence-based method, the number of distinguishable entire TOIDs becomes an index of an available entire sequence, i.e., the number L of available entire sequence. Specifically, the terminal determines an index of a sequence corresponding to timing offset to transmit, allocates the determined sequence to feasible subcarriers, and loads power in subcarriers to which a sequence is allocated. For example, when timing offset that the terminal is to transmit is 8 $t_S$, the terminal allocates a sequence (i.e., a sequence corresponding to a TOID (TO_8)) in which an index is 8 among the L number of sequences to all feasible subcarriers. In the area SSUB1 of FIG. 3, a case in which a length of a sequence is 16 is illustrated. Specifically, when the entire number of feasible subcarriers is 16, the terminal may allocate 16 elements belonging to a sequence in which an index is 8 to 16 subcarriers, respectively. The terminal uniformly divides the entire or a portion of maximum symbol power into the entire number (16) of feasible subcarriers to load (allocate) the divided power in (to) 16 subcarriers, respectively. The terminal transmits a sequence (sequence corresponding to timing offset $8t_S$) that is allocated to 16 subcarriers. $b_Z$ (i) illustrated in the area SSUB1 of FIG. 3 represents an i-th element belonging to the Z-th (having a positive integer value from 0 to L−1) sequence. In the area SSUB1 of FIG. 3, a case in which 16 elements $b_Z(0)$-$b_Z(15)$ belonging to one sequence are allocated to 16 subcarriers, respectively, is illustrated. A sequence that is formed by the $b_Z(i)$ is a base sequence.

The second sequence-based method is illustrated in a frequency domain SSUB2 of a TOIF F1c of FIG. 3. In the second sequence-based method, one TOID is mapped to an index of two sequences. Specifically, one TOID is mapped to one codeword (Z, Y). That is, one codeword (Z, Y) represents a sequence of an index Z and a sequence of an index Y. According to a second sequence-based method, the entire number of codewords becomes the square of a half of the number L (e.g., L=the number of sequences for the index Z plus the number of sequences for the index Y) of all available sequences. For example, when L is 16, the entire number of codewords is 64. Here, Z, which is an element of the codeword (Z, Y) has a positive integer value from 0 to (L/2)−1 (or a value larger than (L/2)−1) and represents a sequence. Specifically, Z represents an index of a sequence that is formed with elements that are allocated to a location of feasible even-numbered (or odd-numbered) subcarriers. For example, in the area SSUB2 of FIG. 3, a case in which a length of a sequence of the index Z is 8 and in which 8 elements $b_Z(0)$-$b_Z(7)$ belonging to a sequence of the index Z are allocated to 8 even-numbered subcarriers, respectively, is illustrated. Y, which is an element of the codeword (Z, Y) has a positive integer value from 0 to (L/2)−1 and represents a sequence. Specifically, Y represents an index of a sequence that is formed with elements that are allocated at a location of feasible odd-numbered (or even-numbered) subcarriers. For example, in the area SSUB2 of FIG. 3, a case in which a length of a sequence of the index Y is 8 and in which 8 elements $m_Y(0)$-$m_Y(7)$ belonging to a sequence of the index Y are allocated to 8 odd-numbered subcarriers, respectively, is illustrated. That is, in the area SSUB2 of FIG. 3, a case in which a length of a sequence of the index Z and a sequence of the index Y is half of the entire number (e.g., 16) of feasible subcarriers is illustrated. For example, when timing offset that the terminal is to transmit is 8 $t_S$, the terminal determines two sequences corresponding to a TOID TO_8 among the L number of sequences. The terminal may allocate elements $b_Z(0)$-$b_Z(7)$ belonging to one sequence of the two determined sequences to 8 even-numbered subcarriers, respectively, of 16 subcarriers, and allocates elements $m_Y(0)$-$m_Y(7)$ belonging to the remaining one sequence of two sequences to 8 odd-numbered subcarriers, respectively, of 16 subcarriers. The terminal uniformly divides the entire or a portion of maximum symbol power into the entire number (16) of feasible subcarriers to load (allocate) the divided power in (to) 16 subcarriers, respectively. The terminal transmits two sequences (two sequences corresponding to timing offset $8t_S$) that are allocated to 16 subcarriers.

Ranges of Z and Y may be different. For example, Z may have a positive integer value from 0 to (L/2)+1, and Y may have a positive integer value from 0 to (L/2)−3.

An element Z of the codeword (Z, Y) may represent an index of a sequence that is formed with elements that are allocated to a location of the feasible odd-numbered subcarriers, and an element Y of the codeword (Z, Y) may represent an index of a sequence that is formed with elements that are allocated to a location of feasible even-numbered subcarriers.

A sequence that is applied to the index Z and a sequence that is applied to the index Y may be the same. Alternatively, a sequence that is applied to the index Z and a sequence that is applied to the index Y may be sequences of a completely different type. Alternatively, a sequence that is applied to the index Z and a sequence that is applied to the index Y are the same, but one of the two sequences is a base sequence and the other one thereof may be an adjusted sequence that is adjusted based on the base sequence. The adjusted sequence will be described in detail. When the entire number of TOIDs is smaller than the entire number of codewords, a codeword to be mapped to a TOID among the entire number of codewords is selected. Specifically, codewords in which a Hamming distance between codewords becomes a maximum of 1 may be selected. That is, an element having the same value (e.g., 0-(L/2)−1) does not exist between codewords or only one element having the same value should exist between codewords. In the area SSUB2 of FIG. 3, a case in which a sequence that is applied to the index Y is an adjusted sequence (corresponding to m(.) of FIG. 3) of a base sequence (corresponding to b(.) of FIG. 3) that is applied to the index Z is illustrated. For example, an adjusted sequence may be a base sequence or may be generated by inversely converting polarity (multiplying −1 by an element value of the base sequence), conjugating (conjugating an element value of the base sequence, i.e., inversely converting polarity of an imaginary part), or conjugating and inversely converting polarity. The reason for using an adjusted sequence is to lower a Peak-to-Average Power Ratio (PAPR) of a time domain signal of a TOIF sub-slot. When the same sequence is used instead of the adjusted sequence, a PAPR of a time domain is greatly raised, and in order to prevent a performance reduction due to a high PAPR, it is necessary to use a high cost amplifier, and thus a drawback that a terminal cost resultantly increases may occur.

The third sequence-based method is illustrated in a frequency domain SSUB3 of a TOIF F1c of FIG. 3. In the third sequence-based method, one TOID is mapped to an index of two sequences. Specifically, one TOID is mapped to one codeword (Z, Y). That is, one codeword (Z, Y) represents a sequence of the index Z and a sequence of the index Y. According to the third sequence-based method, the entire number of codewords becomes the square of half of the number L of all available sequences. Here, Z, which is an element of the codeword (Z, Y), has a positive integer value from 0 to (L/2)−1 (or a value larger than (L/2)−1) and represents a sequence. Specifically, Z represents an index of a sequence that is formed with elements that are allocated to locations of feasible superordinate (or subordinate) subcarriers. For example, in the area SSUB3 of FIG. 3, a case in which a length of a sequence of the index Z is 8 and in which 8 elements $b_Z(0)$-$b_Z(7)$ belonging to a sequence of the index Z are allocated to 8 superordinate subcarriers, respectively, of 16 feasible subcarriers is illustrated. Y, which is an element of the codeword (Z, Y), has a positive integer value from 0 to (L/2)–1 and represents a sequence. Specifically, Y represents an index of a sequence that is formed with elements that are allocated at locations of feasible subordinate (or superordinate) subcarriers. For example, in the area SSUB3 of FIG. 3, a case in which a length of a sequence of the index Y is 8 and in which 8 elements $m_Y(0)$-$m_Y(7)$ belonging to a sequence of the index Y are allocated to 8 subordinate subcarriers, respectively, of 16 feasible subcarriers is illustrated. That is, in the area SSUB3 of FIG. 3, a case in which a length of a sequence of the index Z and a sequence of the index Y is half of the entire number (e.g., 16) of feasible subcarriers is illustrated. For example, when timing offset that the terminal is to transmit is 8 $t_S$, the terminal determines two sequences corresponding to a TOID TO_8 among the L number of sequences. The terminal allocates elements $b_Z(0)$-$b_Z(7)$ belonging to one sequence of the two determined sequences to 8 superordinate subcarriers, respectively, of 16 feasible subcarriers, and allocates elements $m_Y(0)$-$m_Y(7)$ belonging to the remaining one sequence of two sequences to 8 subordinate subcarriers, respectively, of 16 feasible subcarriers. The terminal may uniformly divide the entire or a portion of maximum symbol power into the entire number (16) of feasible subcarriers and load (allocate) the divided power in (to) each of 16 subcarriers. The terminal transmits two sequences (two sequences corresponding to timing offset $8t_S$) that are allocated to 16 subcarriers.

A range of Z and Y may be different. For example, Z may have a positive integer value from 0 to (L/2)+1, and Y may have a positive integer value from 0 to (L/2)–3.

An element Z of the codeword (Z, Y) may represent an index of a sequence that is formed with elements that are allocated to a location of feasible subordinate subcarriers, and an element Y of the codeword (Z, Y) may represent an index of a sequence that is formed with elements that are allocated to a location of feasible superordinate subcarriers.

A sequence that is applied to the index Z and a sequence that is applied to the index Y may be the same. Alternatively, a sequence that is applied to the index Z and a sequence that is applied to the index Y may be sequences of completely different types. Alternatively, a sequence that is applied to the index Z and a sequence that is applied to the index Y are the same, but one of the two sequences may be a base sequence and the other one thereof may be an adjusted sequence that is adjusted based on the base sequence. When the entire number of TOIDs is smaller than that of all codewords, a TOID to be mapped to a TOID among all codewords is selected. Specifically, codewords in which a Hamming distance between codewords becomes a maximum of 1 may be selected. That is, an element having the same value (e.g., 0-(L/2)–1) does not exist between codewords or only one element having the same value should exist between codewords. A sequence that is applied to the index Z and a sequence that is applied to the index Y may be different. Alternatively, as illustrated in the area SSUB3 of FIG. 3, a sequence that is applied to the index Y may be an adjusted sequence (corresponding to m(.)) of a base sequence (corresponding to b(.)) that is applied to the index Z. Specifically, an adjusted sequence may be a base sequence and may be generated by inversely converting polarity, conjugating, or conjugating and inversely converting polarity.

The fourth sequence-based method is illustrated in a frequency domain SSUB4 of the TOIF F1$c$ of FIG. 3. In the fourth sequence-based method, one TOID is mapped to an index of four sequences. Specifically, one TOID is mapped to one codeword (Z, Y, X, W). That is, one codeword (Z, Y, X, W) represents a sequence of an index Z, a sequence of an index Y, a sequence of an index X, and a sequence of an index W. According to a fourth sequence-based method, the entire number of codewords becomes four squares of a fourth of the number L (e.g., L=the sequence number for the index Z+the sequence number for the index Y+the sequence number for the index X+the sequence number for the index W) of all available sequences. For example, when L is 16, the entire number of codewords is 256. Here, Z, which is an element of the codeword (Z, Y, X, W), has a positive integer value from 0 to (L/4)–1 (or a value larger than (L/4)–1) and represents a sequence. Specifically, Z represents an index of a sequence that is formed with elements that are allocated to a location of some superordinate (or subordinate) subcarriers of feasible superordinate (or subordinate) subcarriers. For example, in the area SSUB4 of FIG. 3, a case in which a length of a sequence of the index Z is 4 and in which four elements $b_Z(0)$-$b_Z(3)$ belonging to a sequence of the index Z are allocated to four superordinate subcarriers, respectively, of 8 feasible superordinate subcarriers is illustrated. Y, which is an element of the codeword (Z, Y, X, W) has a positive integer value from 0 to (L/4)–1 and represents a sequence. Specifically, Y represents an index of a sequence that is formed with elements that are allocated to a location of some subordinate (or superordinate) subcarriers of feasible superordinate (or subordinate) subcarriers. For example, in the area SSUB4 of FIG. 3, a case in which a length of a sequence of the index Y is 4 and in which four elements $b_Y(0)$-$b_Y(3)$ belonging to a sequence of the index Y are allocated to four subordinate subcarriers, respectively, of 8 feasible superordinate subcarriers is illustrated. X, which is an element of the codeword (Z, Y, X, W), has a positive integer value from 0 to (L/4)–1 and represents a sequence. Specifically, X represents an index of a sequence that is formed with elements that are allocated at a location of some superordinate (or subordinate) of feasible subordinate (or superordinate) subcarriers. For example, in the area SSUB4 of FIG. 3, a case in which a length of a sequence of the index X is 4 and in which four elements $m_X(0)$-$m_X(3)$ belonging to a sequence of the index X are allocated to four superordinate subcarriers, respectively, of 8 feasible subordinate subcarriers is illustrated. W, which is an element of the codeword (Z, Y, X, W), has a positive integer value from 0 to (L/4)–1 and represents a sequence. Specifically, W represents an index of a sequence that is formed with elements that are allocated at a location of some subordinate (or superordinate) subcarriers of feasible subordinate (or superordinate) subcarriers. For example, in the area SSUB4 of FIG. 3, a case in which a length of a sequence of the index W is 4 and in which four elements $m_W(0)$-$m_W(3)$ belonging to a sequence of the index W are allocated to four subordinate subcarriers, respectively, of 8 feasible subordinate subcarriers is illustrated. That is, in the area SSUB4 of FIG. 3, a case in which a length of a sequence of the index Z, a sequence of the index Y, a sequence of the index X, and of a sequence of the index W is a fourth of the entire number (e.g., 16) of feasible subcarriers is illustrated. For example, when timing offset that the terminal is to transmit is 8 $t_S$, the terminal determines four sequences corresponding to a TOID TO_8 among the L number of sequences. The terminal allocates elements $b_Z(0)$-$b_Z(3)$ belonging to one sequence of the four determined sequences to four superordinate subcarriers, respectively, of 8 feasible superordinate subcarriers, allocates elements $b_Y(0)$-$b_Y(3)$ belonging to another sequence of four sequences to four subordinate subcarriers, respectively, of 8 feasible superordinate subcarriers, allocates elements $m_X(0)$-$m_X(3)$ belonging to another sequence of four sequences to four superordinate subcarriers, respectively, of 8 feasible subordinate subcarriers, and allocates elements $m_W(0)$-$m_W(3)$ belonging to the remaining one sequence of four sequences to four subordinate subcarriers, respectively, of 8 feasible subordinate subcarriers. The terminal may uniformly divide the entire or a portion of maximum symbol power into the entire number (16) of feasible subcarriers and load (allocate) the divided power in (to) each of 16 subcarriers. The terminal transmits four sequences (four sequences corresponding to timing offset $8t_S$) that are allocated to 16 subcarriers.

Ranges of Z, Y, X, and W may be different. For example, Z may have a positive integer value from 0 to (L/4)+1, Y may have a positive integer value from 0 to (L/4)−3, X may have a positive integer value from 0 to (L/4)−3, and W may have a positive integer value from 0 to (L/4)+1.

Sequences that are applied to the index Z, the index Y, the index X, and the index W may be the same. Alternatively, sequences that are applied to the index Z, the index Y, the index X, and the index W may be sequence of completely different types. Alternatively, sequences that are applied to the index Z, the index Y, the index X, and the index W are the same, but some sequences may be a base sequence and some other sequences may be adjusted sequences that are adjusted based on the base sequence. When the entire TOIDs is smaller than that of the entire number of codewords, a codeword to be mapped to the TOID among the entire codewords is selected. Specifically, codewords in which a Hamming distance between codewords becomes a maximum of 2 may be selected. That is, an element having the same value (e.g., 0–(L/4)−1) does not exist between codewords, only one element having the same value should exist between codewords, or only two elements having the same value should exist between codewords. In an area SSUB4 of FIG. 3, a case in which a base sequence (corresponding to b(.)) is applied to a sequence of the index Z and a sequence of the index Y and in which an adjusted sequence (corresponding to m(.)) is applied to a sequence of the index X and a sequence of the index W is illustrated. For example, a sequence that is applied to the index X may be a base sequence (adjusted sequence $m_X(.)$ of $b_Z(.)$) that is applied to the index Z, and a sequence that is applied to the index W may be a base sequence (adjusted sequence $m_W(.)$ of $b_Y(.)$) that is applied to the index Y. Specifically, an adjusted sequence that is applied to the fourth sequence-based method may be a base sequence or may be generated by inversely converting polarity, conjugating, or conjugating and inversely converting polarity.

The fifth sequence-based method is illustrated in a frequency domain SSUB5 of the TOIF F1c of FIG. 3. In the fifth sequence-based method, one TOID is mapped to an index of four sequences. Specifically, one TOID is mapped to one codeword (Z, Y, X, W). That is, one codeword (Z, Y, X, W) represents a sequence of an index Z, a sequence of an index Y, a sequence of an index X, and a sequence of an index W. According to the fifth sequence-based method, the entire number of codewords becomes four squares of a fourth of the number L of all available sequences. Here, Z, which is an element of the codeword (Z, Y, X, W), has a positive integer value from 0 to (L/4)−1 (or a value larger than (L/4)−1) and represents a sequence. Specifically, Z represents an index of a sequence that is formed with elements that are allocated to a location of some superordinate (or subordinate) subcarriers of feasible superordinate (or subordinate) subcarriers. For example, in the area SSUB5 of FIG. 3, a case in which a length of a sequence of the index Z is 4 and in which four elements $b_Z(0)$-$b_Z(3)$ belonging to a sequence of the index Z are allocated to four superordinate subcarriers, respectively, of 8 feasible superordinate subcarriers is illustrated. Y, which is an element of the codeword (Z, Y, X, W), has a positive integer value from 0 to (L/4)−1 and represents a sequence. Specifically, Y represents an index of a sequence that is formed with elements that are allocated to a location of some subordinate (or superordinate) subcarriers of feasible superordinate (or subordinate) subcarriers. For example, in the area SSUB5 of FIG. 3, a case in which a length of a sequence of the index Y is 4 and in which four elements $m_Y(0)$-$m_Y(3)$ belonging to a sequence of the index Y are allocated to four subordinate subcarriers, respectively, of 8 feasible superordinate subcarriers is illustrated. X, which is an element of the codeword (Z, Y, X, W), has a positive integer value from 0 to (L/4)−1 and represents a sequence. Specifically, X represents an index of a sequence that is formed with elements that are allocated to a location of some superordinate (or subordinate) subcarriers of feasible subordinate (or superordinate) subcarriers. For example, in the area SSUB5 of FIG. 3, a case in which a length of a sequence of the index X is 4 and in which four elements $b_X(0)$-$b_X(3)$ belonging to a sequence of the index X are allocated to four superordinate subcarriers, respectively, of 8 feasible subordinate subcarriers is illustrated. W, which is an element of the codeword (Z, Y, X, W), has a positive integer value from 0 to (L/4)−1 and represents a sequence. Specifically, W represents an index of a sequence that is formed with elements that are allocated to a location of some subordinate (or superordinate) subcarriers of feasible subordinate (or superordinate) subcarriers. For example, in the area SSUB5 of FIG. 3, a case in which a length of a sequence of the index W is 4 and in which four elements $m_W(0)$-$m_W(3)$ belonging to a sequence of the index W are allocated to four subordinate subcarriers, respectively, of 8 feasible subordinate subcarriers is illustrated. That is, in the area SSUB5 of FIG. 3, a case in which a length of a sequence of an index Z, an index Y, an index X, and an index W is a fourth of the entire number (e.g., 16) of feasible subcarriers is illustrated. For example, when timing offset that the terminal is to transmit is $8 t_S$, the terminal determines four sequences corresponding to a TOID TO_8 among the L number of sequences. The terminal allocates elements $b_Z(0)$-$b_Z(3)$ belonging to one sequence of the determined four sequences to four superordinate subcarriers, respectively, of 8 feasible superordinate subcarriers, allocates elements $m_Y(0)$-$m_Y(3)$ belonging to another sequence of four sequences to four subordinate subcarriers, respectively, of 8 feasible superordinate subcarriers, allocates elements $b_X(0)$-$b_X(3)$ belonging to another sequence of four sequences to four superordinate subcarriers of 8 feasible subordinate subcarriers, and allocates elements $m_W(0)$-$m_W(3)$ belonging to the remaining one sequence of four sequences to four subordinate subcarriers, respectively, of 8 feasible subordinate subcarriers. The terminal may uniformly divide the entire or a portion of maximum symbol power into the entire number (16) of feasible subcarriers and load (allocate) the divided power in(to) each of 16 subcarriers. The terminal transmits four sequences (four sequences corresponding to timing offset $8t_S$) that are allocated to 16 subcarriers.

Ranges of Z, Y, X, and W may be different. For example, Z may have a positive integer value from 0 to (L/4)+1, Y may have a positive integer value from 0 to (L/4)−3, X may have a positive integer value from 0 to (L/4)−3, and W may have a positive integer value from 0 to (L/4)+1.

Sequences that are applied to the index Z, the index Y, the index X, and the index W may be the same. Alternatively, sequences that are applied to the index Z, the index Y, the index X, and the index W may be sequences of completely different types. Alternatively, sequences that are applied to the index Z, the index Y, the index X, and the index W are the same, but some sequences may be a base sequence and some other sequences may be an adjusted sequence that is adjusted based on the base sequence. When the entire number of TOIDs is smaller than that of the entire number of codewords, a codeword to be mapped to the TOID among the all codewords is selected. Specifically, codewords in which a Hamming distance between codewords becomes a maximum of 2 may be selected. That is, an element having the same value (e.g., 0–(L/4)–1) does not exist between codewords, only one element having the same value should exist between codewords, or only two elements having the same value should exist between codewords. In the area SSUB5 of FIG. 3, a case in which a base sequence (corresponding to b(.)) is applied to a sequence of the index Z and a sequence of the index X and in which an adjusted sequence (corresponding to $m_W(.)$) is applied to a sequence of the index Y and a sequence of the index W is illustrated. For example, a sequence that is applied to the index Y may be a base sequence (adjusted sequence $m_Y(.)$ of $b_Z(.)$) that is applied to the index Z, and a sequence that is applied to the index W may be a base sequence (adjusted sequence $m_W(.)$ of $b_X(.)$) that is applied to the index X. Specifically, an adjusted sequence that is applied to a fifth sequence-based method may be a base sequence and may be generated by inversely converting polarity, conjugating, or conjugating and inversely converting polarity.

In the tone-based method and the sequence-based method of loading and carrying the above-described timing offset information, a merit and a drawback exist. Specifically, in the tone-based method, because it is necessary for a receiving terminal to estimate only a tone exceeding a threshold value within a corresponding subcarrier group, a receiving operation of the receiving terminal is simple. Further, in the tone-based method, because a transmitting terminal loads and transmits power only in one frequency domain tone or a very small number of frequency domain tones (e.g., subcarrier), a PAPR of a time domain may be very low. For better understanding, when an impulse of a frequency domain is formed in a time domain signal through Fourier transform, a signal having a flat magnitude is generated and thus a PAPR of the signal theoretically becomes 0 dB. However, in the sequence-based method, the receiving terminal should correlate or dispread a corresponding subcarrier group and may have a somewhat high PAPR, compared with the tone-based method. Therefore, the tone-based method may be designed with low power compared with the sequence-based method in an implementation aspect. In the tone-based method, a tone (e.g., subcarrier) in which power is loaded may be in deep fading in view of a characteristic of a radio channel and thus TOID estimation performance of the receiving terminal may be deteriorated. However, in the sequence-based method, because the transmitting terminal not only loads and transmits power only to a specific subcarrier but also loads and transmits uniform power and an element of a sequence to all feasible subcarriers, a diversity gain and a diffusion gain may be acquired. Therefore, the sequence-based method may be much better than the tone-based method in a TOID estimation performance. Therefore, one of a tone-based method and a sequence-based method may be selected according to a pursuit direction. Both a tone-based method and a sequence-based method may be designed with much lower power than that of a transmitting method of a message form that should apply channel decoding.

FIGS. 2 and 3 illustrate a case in which all feasible subcarrier resources are divided into a maximum of four groups. Further, in FIGS. 2 and 3, when all feasible subcarrier resources are divided into four groups, if the entire number of TOIDs is smaller than that of all codewords, a case of mapping codewords in which a Hamming distance between codewords having a length of 4 becomes a maximum of 2 to the TOID is illustrated. However, this is just an illustration. An exemplary embodiment of the present invention may be applied to a case in which all feasible subcarrier resources are divided into the maximum number Q (Q is the natural number) of groups. Further, when all feasible subcarrier resources are divided into the Q number of groups, if the entire number of TOIDs is smaller than that of the entire number of codewords, an exemplary embodiment that maps codewords in which a Hamming distance between codewords having a length of Q becomes a minimum of 2 to the TOID may be included in an exemplary embodiment of the present invention.

In FIGS. 2 and 3, a case of using one time domain symbol is illustrated. This is just an illustration. When it is necessary to increase the entire number of distinguishable TOIDs, an exemplary embodiment of FIGS. 2 and 3 may be extended. For example, when a plurality of (e.g., the M number) adjacent or non-adjacent time domain symbols are used, the M number of symbols are orthogonal in a time domain and thus the entire number of TOIDs may increase by P times, compared with when one time domain symbol is used. Alternatively, when the M number of time domain symbols are used, additional time domain symbols may not be used for increasing the number of TOIDs but may be used for enhancing detection performance of a TOID. In a method of using a plurality of symbols, frequency domain TOID mapping that is applied to a first symbol of a plurality of symbols may be applied to the remaining symbols of the plurality of symbols. Alternatively, in a method of using a plurality of symbols, various other forms of TOID mapping may be applied to each of the plurality of symbols. A method of using a plurality of symbols will be described in detail with reference to FIG. 4.

Figure 4:
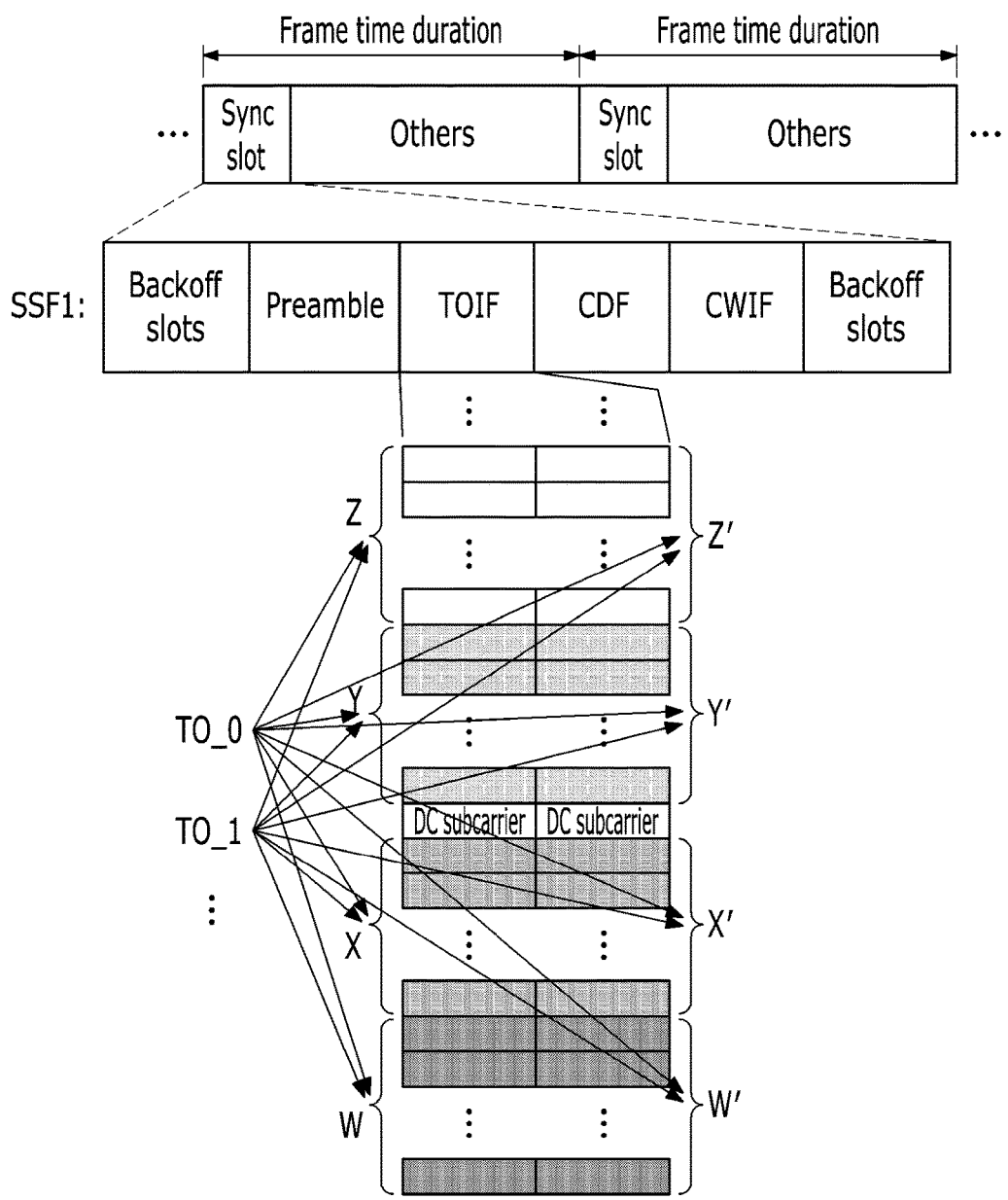
FIG. 4 is a diagram illustrating a method of loading and carrying timing offset information based on a tone when using two symbols.

FIG. 4 is a diagram illustrating a method of loading and carrying timing offset information based on a tone (i.e., a tone-based method) when using two symbols. Specifically, FIG. 4 illustrates a case in which all feasible subcarriers are divided into 8 subcarrier groups. A tone-based method using two symbols is similar to the above-described tone-based method in an invention principle. Hereinafter, a tone-based method using two symbols different from a tone-based method using one symbol will be described.

As illustrated in FIG. 4, respective group names of 8 subcarrier groups are Z, Y, X, W, Z', Y', X', and W'. Codewords Z, Y, X, W, Z', Y', X', and W' in which a length is 8 may be generated. Subcarriers that are represented by Z, Y, X, and W are elements of a codeword correspond to a first time domain symbol, and subcarriers that are represented by Z', Y', X', and W' are elements of a codeword correspond to a second time domain adjacent to a first time domain symbol. Each subcarrier group includes the E number of subcarriers. That is, each of Z, Y, X, W, Z', Y', X', and W', which are elements of a codeword, equally has a positive integer value from 0 to E–1.

When the entire number of TOIDs is smaller than that of the entire number of codewords, codewords in which a Hamming distance between codewords is a minimum of 2 or more may be mapped to the TOID. Specifically, one TOID is mapped to one codeword (Z, Y, X, W, Z', Y', X', W'). Here, one codeword (Z, Y, X, W, Z', Y', X', W') represents 8 subcarrier groups (four subcarrier groups corresponding to a first time domain symbol, and four subcarrier groups corresponding to a second time domain symbol), and each TOID represents a timing offset value.

According to a method of using a plurality of symbols, even if some subcarrier groups are damaged due to deep fading, a receiving terminal can correctly detect a TOID through the remaining element values. Further, according to a method of using a plurality of symbols, a kind of diversity gain can be acquired. Further, according to a tone-based method of using a plurality of symbols, because a transmitting terminal entirely allocates signal power to one subcarrier belonging to each subcarrier group, a PAPR may be much lowered.

In the foregoing description, a sequence-based method and a tone-based method of loading and carrying timing offset information have been described, but this is just an illustration. A tone-based method and a sequence-based method according to an exemplary embodiment of the present invention may be applied to a CWIF or a CDF in addition to a TOIF. That is, a tone-based method and a sequence-based method according to an exemplary embodiment of the present invention may be applied even to a case of loading and carrying contention window size information or collision detection information in addition to timing offset information.

As a method of loading and carrying information (e.g., timing offset information (TOID), a Contention Window Indication iDentifier (CWID)) that is designed under time domain structures SSF1-SSF4 of a synchronization slot that is included in a frame, a method of applying all available channel coding techniques in addition to a method of using orthogonality of a signal of the above-described physical layer (a method of not using a channel coding technique) may be included in the scope of the present invention.

Further, as a method of loading and carrying information (e.g., timing offset information (TOID), a Contention Window Indication iDentifier (CWID)) that is designed under time domain structures SSF1-SSF4 of a synchronization slot that is included in a frame, a method of using orthogonality of a signal of the above-described physical layer, and a method of mixedly using a coding technique of all available channel coding techniques may be included in the scope of the present invention. For example, a transmitting terminal may transmit timing offset information using a method of using orthogonality of a signal of the above-described physical layer (e.g., a tone-based method and a sequence-based method) and transmit contention window size information using a channel coding technique. For another example, a transmitting terminal may transmit contention window size information using a method of using orthogonality of a signal of the above-described physical layer (e.g., a tone-based method and sequence-based method) and transmit timing offset information using a channel coding technique.

Figure 5:
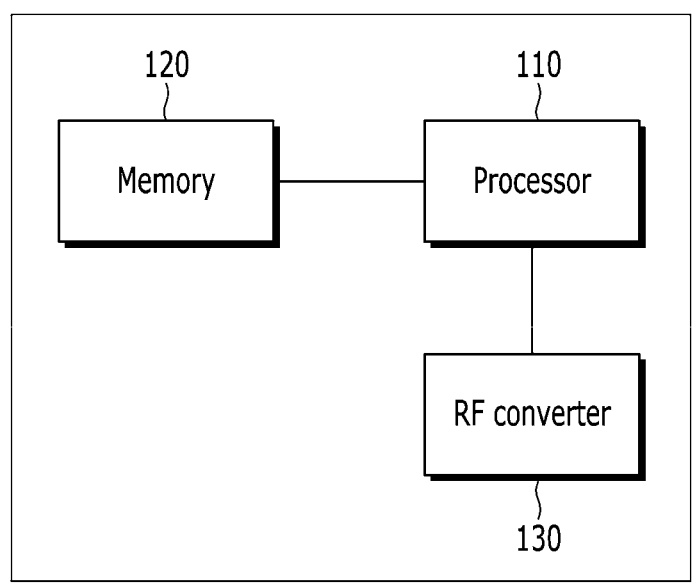
FIG. 5 is a block diagram illustrating a configuration of a terminal according to an exemplary embodiment of the present invention.

FIG. 5 is a block diagram illustrating a configuration of a terminal 100 according to an exemplary embodiment of the present invention.

The terminal 100 includes a processor 110, a memory 120, and a Radio Frequency (RF) converter 130.

The processor 110 may be formed to implement a procedure, a function, and a method that are related to a terminal that is described with reference to FIGS. 1 to 4.

The memory 120 is connected to the processor 110 and stores various information that is related to operation of the processor 110.

The RF converter 130 is connected to the processor 110 and transmits or receives a wireless signal. The terminal 100 may have a single antenna or multiple antennas.

An exemplary embodiment of the present invention may be applied to a transmitter or a receiver of other forms instead of the terminal 100.

According to an exemplary embodiment of the present invention, in a distributed node system that adapts a collision avoidance-based distributed synchronization method, a receiving terminal can acquire timing offset information and contention window size information of another terminal with low power through a timing offset identifier field and a contention window indication identifier field that are designed under a time domain structure of a synchronization slot that is included in a frame.

Further, according to an exemplary embodiment of the present invention, even within a distributed node network, a network can be synchronized and communication between terminals can be implemented with low power.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method for a transmitter to transmit control information, the method comprising:
    determining a first value to be transmitted among values of the control information;
    determining a first codeword corresponding to the first value among a plurality of codewords;
    determining a plurality of first subcarriers corresponding to a plurality of elements belonging to the first codeword; and
    allocating busy tones to the plurality of first subcarriers, wherein each of the plurality of first subcarriers belongs to each of a plurality of subcarrier groups.

2. The method of claim 1, wherein the control information includes at least one of timing offset information and contention window size information, the timing offset information indicating a time difference between a start point of a frame and a start point of transmission of a preamble.

3. The method of claim 2, wherein the frame includes:
    a first segment in which the preamble is transmitted; and
    a second segment located immediately after the first segment and in which the control information is transmitted.

4. The method of claim 2, wherein a synchronization slot included in the frame comprises:
    a first segment in which the preamble is transmitted;
    a nulling segment located immediately before the first segment and for reducing a signal collision;
    a second segment located immediately after the first segment and in which the timing offset information is transmitted; and
    a third segment located immediately after the second segment and in which the contention window size information is transmitted.

5. The method of claim 1, wherein
    when the plurality of elements belonging to the first codeword are (z, y, x, w), a first subcarrier corresponding to the z element among the plurality of first subcarriers belongs to a first subcarrier group among the plurality of subcarrier groups, a first subcarrier corresponding to the y element among the plurality of first subcarriers belongs to a second subcarrier group among the plurality of subcarrier groups, a first subcarrier corresponding to the x element among the plurality of first subcarriers belongs to a third subcarrier group among the plurality of subcarrier groups, and a first subcarrier corresponding to the w element among the plurality of first subcarriers belongs to a fourth subcarrier group among the plurality of subcarrier groups.

6. The method of claim 1, wherein when the plurality of elements belonging to the first codeword are (z, y), a first subcarrier corresponding to the z element among the plurality of first subcarriers belongs to a first subcarrier group among the plurality of subcarrier groups, and a first subcarrier corresponding to the y element among the plurality of first subcarriers belongs to a second subcarrier group among the plurality of subcarrier groups.

7. The method of claim 1, further comprising transmitting a preamble for providing synchronization of a frame in a network in which an infrastructure does not exist, wherein the transmitter is a terminal that is different from an access point and a base station.

8. The method of claim 1, further comprising allocating 1/N of a maximum power for one time domain symbol to each of the busy tones allocated to the first subcarriers when the plurality of first subcarriers is N subcarriers and N is a natural number of 2 or more.

9. The method of claim 1, wherein a second codeword of the plurality of codewords has a maximum of two elements among the plurality of elements belonging to the first codeword.

10. The method of claim 1, wherein at least one of the plurality of subcarrier groups corresponds to a first time domain symbol, and at least another one of the plurality of subcarrier groups corresponds to a second time domain symbol.

* * * * *